United States Patent Office 3,288,016
Patented Nov. 29, 1966

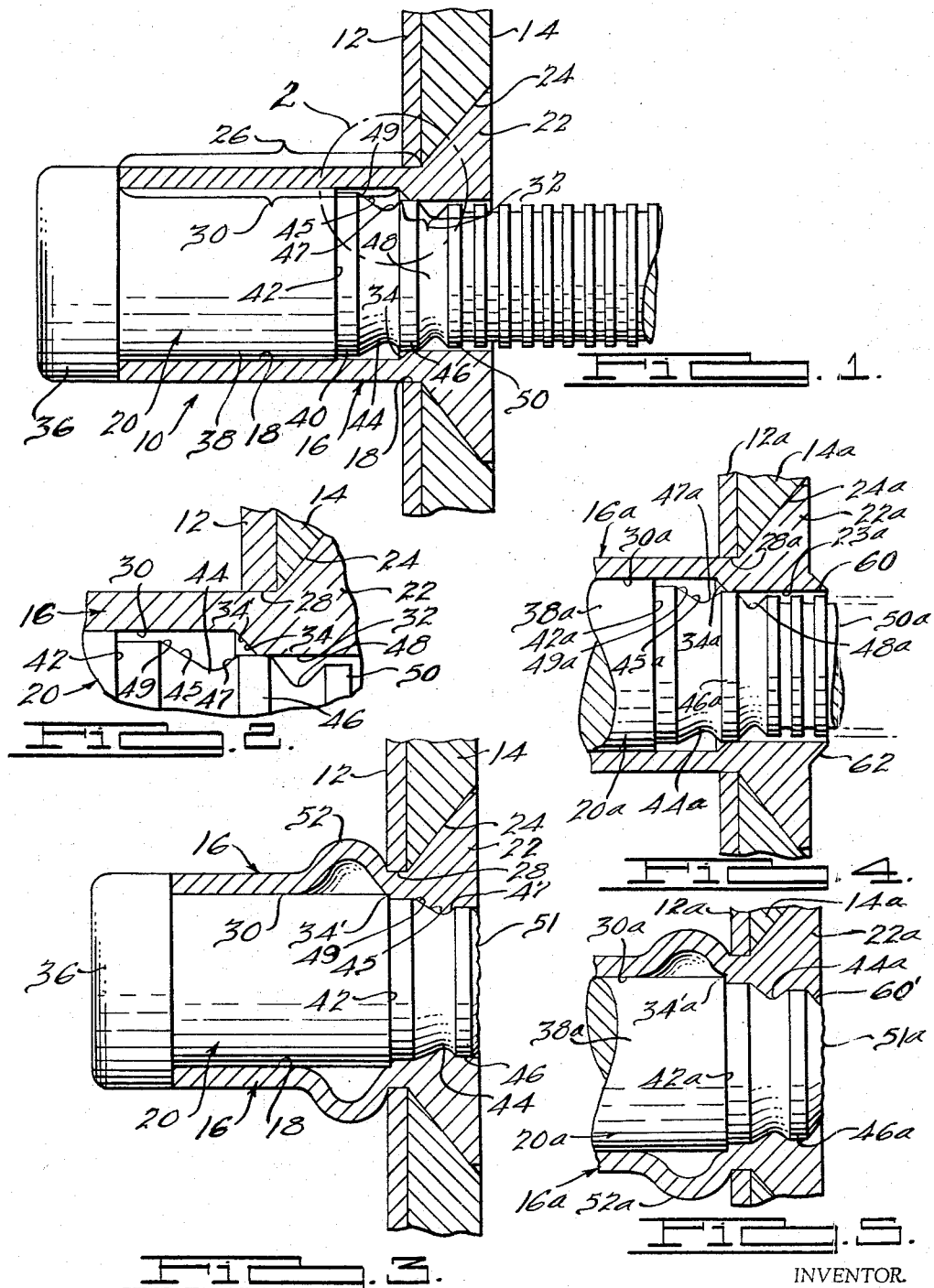

1

3,288,016
BLIND TWO-PIECE FASTENER
Perry J. Reynolds, Detroit, Mich., assignor to Huck Manufacturing Company, Detroit, Mich., a corporation of Michigan
Filed July 6, 1964, Ser. No. 380,595
4 Claims. (Cl. 85—70)

This invention relates to fasteners and more particularly to blind two-piece fasteners with means for locking the pieces together and being of the type shown and described in the United States patents to Huck No. 2,466,811 and No. 2,526,235.

It is a general object of the present invention to provide a fastener having an improved construction. It is a further object of this invention to provide an improved two-piece fastener including a pin and a tubular member wherein means are provided for limiting the motion of the pin through the tubular member and also for positively locking the pin and the tubular member together.

It is still another object of this invention to provide an improved fastener of the type shown in the patents to Huck, supra; in view of the preceding object, it is an additional object to provide such an improved fastener having improved means for locking the pin and the tubular member together.

Other objects, features, and advantages of the present invention will become apparent from the subsequent description and the appended claims, taken in conjunction with the accompanying drawings, in which:

FIGURE 1 is a side elevational view of a fastener with some parts sectioned and some parts partially shown, embodying the features of the present invention and in assembled relationship with a pair of workpieces to be fastened together and with the fastener being depicted prior to being set;

FIGURE 2 is an enlarged view of that portion of FIGURE 1 indicated by dotted circle 2;

FIGURE 3 is a view like that of FIGURE 1 depicting the fastener of FIGURE 1 after it has been set;

FIGURE 4 is a fragmentary view similar to that of FIGURE 1 of a modified fastener prior to being set; and FIGURE 5 is a view similar to that of FIGURE 4 depicting the fastener of FIGURE 4 after it has been set.

Looking now to FIGURES 1–3 a fastener 10 is shown in assembled relationship with a pair of workpieces 12 and 14 to be joined together and generally comprises a tubular sleeve 16 with a central through bore 18 and a pin 20 extending therethrough.

The sleeve 16 has a frusto conically shaped head 22 at its forward end which fits matably within a chamfered bore 24 in the forward workpiece 14. The sleeve 16 has a cylindrical body portion 26 which extends rearwardly through and substantially beyond an opening 28 in the rear workpiece 12. The bore 18 has an increased diameter section 30 extending from the rear end of the sleeve 16 through the cylindrical portion 26 and terminating proximate the head 22 and in communication with a reduced diameter section 32 which extends through the head 22. The juncture of the sections 30 and 32 define a radially inwardly extending shoulder 34 which tapers axially forwardly. As will be seen, the shoulder 34 provides material for positively locking the pin 20 and the sleeve 16 together and also provides a positive stop for limiting the movement of the pin 20 relative to the sleeve 16.

The pin 20 as assembled to the sleeve 16 has an en-

2 larged head portion 36 of a diameter substantially equal to the outside diameter of the cylindrical portion 26 and is engageable with the rearward end of the cylindrical portion 26. A smooth cylindrical shank portion 38 of a diameter substantially equal to that of the section 30 of bore 18 is located proximate the head portion 36 and with the head portion in engagement with the end of the cylindrical portion 26 the shank portion 38 terminates at a point short of the shoulder 34. A reduced diameter cylindrical hole fill portion 40 is located proximate the shank portion 38 and defines therewith a stop shoulder 42. The hole fill portion 40 is of a diameter less than the diameter of section 30 of bore 18 but greater than the diameter of section 32 and serves a purpose to be described. Adjacent the hole fill portion 40 is an annular locking groove 44 which in a forward direction initially extends radially inwardly gradually along a radial surface 45 and then more sharply extends radially outwardly along a surface 47. The surface 45 of locking groove 44 defines with the hole fill portion 40 an extruding shoulder 49. The angle of taper of the surface 45 is less than that of the shoulder 34 of the sleeve 16 for a purpose to be seen. Adjacent the locking groove 44 is a straight cylindrical land portion 46 which is of a diameter substantially equal to that of the section 32 of bore 18.

A reduced section breakneck groove 48 is located adjacent the land portion 46 and provides the weakest section of the pin 20 at which the pin 20 will sever at the completion of the setting operation. A plurality of gripping grooves are located in a pin tail portion 50 which extends from the breakneck groove 48 and which terminates the end of the pin 20 opposite the head portion 36. The pin tail portion 50 has a maximum diameter which is less than the minimum diameter of the bore 18.

The fastener 10 can be set by a tool well known in the art and which includes means for engaging the forward face of the head 22 of sleeve 16 and a chuck jaw assembly for gripping the pin tail portion 50 of the pin 20 and which tool thereby applies a relative axial force between the pin 20 and the sleeve 16. As the pin 20 moves axially relative to the sleeve 16 the cylindrical portion 26 bulbs radially outwardly at a point proximate the rear surface of workpiece 12 to form a blind head 52. As the relative axial force is continued to be applied, the extruding shoulder 49 engages the radially inward portion of the shoulder 34. Note that since the taper of the surface 45 of the extruding shoulder 49 is less than the taper of the shoulder 34, engagement occurs along the tapered surface 45 thereby facilitating extrusion of the metal of the shoulder 34 rather than tearing or fracturing. This engagement or interference causes the adjacent material of the sleeve to move radially outwardly to fill the apertures 24 and 28 in the workpieces 14 and 12, respectively, and also causes the excess material of the shoulder 34 to move into the volume defined by the locking groove 44 and the confronting, radial surface of the sleeve 16. Since only the radially inner portion of the shoulder 34 is displaced the radially outer portion 34' remains and engages the stop shoulder 42 as the pin 20 is moved farther. When the latter event occurs, the relative axial force increases and the pin tail 50 is severed at the breakneck groove 48 with further relative axial movement of pin 20 being prevented by the engagement between shoulder 42 and shoulder portion 34'. With the pin tail severed the setting operation is completed. Note that the relative axial movement of the pin 20 is designed to be such that the remaining end surface 51 at the breakneck groove 48 of the pin 20 is substantially flush with the forward surface of the head 22. The volume of material of the shoulder 34 exceeding that of the remaining shoulder portion 34' is preferably selected to be sufficient to permit hole filling of the apertures of the workpieces and also to provide sufficient material to substantially fill the volume defined by the locking groove 44 and the radially confronting surface of the sleeve 16. As can be seen in FIGURE 3, the pin 20 and sleeve 16 are positively locked together. Note also that the lock is formed by material which is integral with the remainder of the sleeve 16.

With fasteners constructed in accordance with the patents to Huck, supra, a double acting tool was necessary in order to set the locking ring into the locking groove after the blind head was formed. With the fastener of the present invention a single acting tool can be utilized since no locking ring is to be set.

FIGURE 4 depicts a modification of the fastener of FIGURES 1–3 and like components serving like functions are given the same numeral designation with the addition of a letter subscript. The sleeve 16a is provided with a head portion 22a having an annular ring portion 60 extending axially outwardly from its forward surface and located proximate the bore 18a. The radially outer surface 62 of ring portion 60 tapers radially inwardly as it extends axially forwardly. The tool initially bears against the surface 62 and hence urges the ring portion 60 radially inwardly. The ring portion 60 is provided with sufficient section to withstand the force of the tool until the stop shoulder 42a of the pin 20a and corresponding shoulder 34a of the sleeve 16a are engaged. At this time the relative axial force applied by the tool increases and deforms the ring portion 60 radially inwardly (see 60', FIGURE 5) into the breakneck groove 48a and into engagement with the pin 20a to aid in stopping the movement of the pin 20a relative to the sleeve 16a. The axial force of the tool increases severing the pin tail portion 50a at the breakneck groove 48a. Thus the ring portion 60 provides additional means for stopping the pin 20a at a selected position within the sleeve 16a.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A fastener for joining together a plurality of workpieces having aligned openings comprising: a pin and a tubular sleeve member, said sleeve member having a through bore and having an enlarged head for engaging the forward one of the workpieces and having a cylindrical portion for extending rearwardly from said enlarged head through the aligned openings and terminating beyond the rearward one of the workpieces, said bore having a forward bore portion extending generally forwardly from a point proximate said enlarged head and a rearward bore portion extending generally rearwardly from said point with said forward bore portion being of a smaller diameter than said rearward bore portion, a radially inwardly extending shoulder portion located adjacent said enlarged head and at the juncture of said forward and rearward bore portions, said pin comprising a shank extending through said bore and head means at one end of said shank engageable with the end of said cylindrical portion opposite said enlarged head for forming a deformed, enlarged head in that portion of said sleeve extending beyond the rearward one of the workpieces as said pin is moved axially forwardly relatively to said sleeve, means on the end of said shank opposite said head means for being gripped by a tool whereby a relative axial force can be applied between said pin and said sleeve for setting the fastener, said shank having an annular locking groove located intermediate its ends, said locking groove having a first annular shoulder at its rearward end on said shank and being of a diameter less than said rearward bore portion and greater than said shoulder portion and being engageable with a first portion of said shoulder portion for deforming material from said shoulder portion into said locking groove as said pin is moved relatively from its initial unset position to a preselected position after the fastener has been set whereby said pin and said sleeve are locked together, an annular portion located at the forward end of said locking groove and being of a diameter proximate to the diameter of said forward bore portion, said annular portion having an axial length less than that of said forward bore portion, a second annular shoulder on said shank intermediate said first annular shoulder and said head means and being of a diameter greater than said first annular shoulder and being engageable with a second portion of said shoulder portion for stopping the axially forward movement of said pin at said preselected position said second annular shoulder extending generally transversely to the axis of said pin and being axially spaced from said first annular shoulder a distance less than the axial length of said forward bore portion.

2. The fastener of claim 1 further including stop means on said enlarged head for engaging said pin at a preselected axial force after said second annular shoulder engages said second portion of said shoulder portion for additionally stopping the axial forward movement of said pin at said preselected position.

3. The fastener of claim 1 further including an axially forwardly extending ring portion integral with said enlarged head and located at the periphery of said bore and having a preselected cross-section for being deformed radially inwardly into engagement with said pin with a preselected axial force applied thereto after said second annular shoulder engages said second portion of said shoulder portion for additionally stopping the axially forward movement of said pin at said preselected position.

4. A fastener for joining together a plurality of workpieces having aligned openings comprising: a pin and a tubular sleeve member, said sleeve member having a through bore and having an enlarged head for engaging the forward one of the workpieces and having a cylindrical portion for extending rearwardly from said enlarged head through the aligned openings and terminating beyond the rearward one of the workpieces, said bore having a forward bore portion extending generally forwardly from a point proximate said enlarged head and a rearward bore portion extending generally rearwardly from said point with said forward bore portion being of a smaller diameter than said rearward bore portion, a radially inwardly extending shoulder portion located adjacent said enlarged head and at the juncture of said forward and rearward bore portions and having an annular surface extending axially forwardly and tapering radially inwardly, said pin comprising a shank extending through said bore and head means at one end of said shank engageable with the end of said cylindrical portion opposite said enlarged head for forming a bulbed head in that portion of said sleeve extending beyond the rearward one of the workpieces as said pin is moved axially forwardly relatively to said sleeve, means on the end of said shank opposite said head means for being gripped by a tool whereby a relative axial force can be applied between said pin and said sleeve for setting the fastener, said shank having an annular locking groove located intermediate its ends, said locking groove having a first annular shoulder at its rearward end on said shank and being of a diameter less than said rearward bore portion and greater than said shoulder portion and having an annular inclined surface extending axially forwardly and tapering radially inwardly at an angle less than the angle of inclination of said annular surface of said shoulder portion and being engageable with a first portion of said shoulder portion along said inclined surface for deforming material from said shoulder portion into said locking groove as said pin is moved relatively from its initial, unset position to a preselected position after the fastener has been set whereby said pin and said sleeve are locked together, an annular portion located at the forward end of said locking groove and being of a diameter proximate to the diameter of said forward bore portion, said annular portion having an axial length less than that of said forward bore portion, a second annular shoulder on said shank intermediate said first annular shoulder and said head means and being of a diameter greater than said first annular shoulder and being engageable with a second portion of said shoulder portion for stopping the axially forward movement of said pin at said reselected position, said second annular shoulder extending generally transversely to the axis of said pin and being axially spaced from said first annular shoulder a distance less than the axial length of said forward bore portion.

References Cited by the Examiner

UNITED STATES PATENTS

| | | | |
|---|---|---|---|
| 2,061,628 | 11/1936 | Huck | 85—70 |
| 2,298,203 | 10/1942 | Eklund | 85—74 |
| 2,384,321 | 9/1945 | Lees | 85—78 |
| 2,466,811 | 4/1949 | Huck | 85—78 |
| 2,526,235 | 10/1950 | Huck | 85—78 |
| 2,538,623 | 1/1951 | Keating | 85—78 |
| 2,887,694 | 5/1959 | Sauter | 85—72 |
| 3,009,383 | 11/1961 | Block | 85—77 |

THOMAS F. CALLAGHAN, *Primary Examiner.*

M. PARSONS, JR., *Assistant Examiner.*